US012784444B2

(12) United States Patent
Sampson et al.

(10) Patent No.: US 12,784,444 B2
(45) Date of Patent: Nov. 3, 2026

(54) TREE ASSESSMENT METHOD AND TREE ASSESSMENT DEVICE

(71) Applicant: GREENVITA PTE. LTD., Singapore (SG)

(72) Inventors: Hui Wu Sampson, Austin, TX (US); Siew Juan Chong, Singapore (SG); Xu Yang, Shijiazhuang City (CN)

(73) Assignee: GREENVITA PTE. LTD., Singapore (SG)

( * ) Notice: Subject to any disclaimer, the term of this patent is extended or adjusted under 35 U.S.C. 154(b) by 239 days.

(21) Appl. No.: 18/766,671

(22) Filed: Jul. 9, 2024

(65) Prior Publication Data

US 2026/0017943 A1 Jan. 15, 2026

(51) Int. Cl.

*G06V 20/10* (2022.01)
*G06V 10/764* (2022.01)
*G06V 10/778* (2022.01)

(52) U.S. Cl.

CPC .......... *G06V 20/188* (2022.01); *G06V 10/764* (2022.01); *G06V 10/7784* (2022.01)

(58) Field of Classification Search

CPC ............... G06V 20/188; G06V 10/764; G06V 10/7784; G06V 10/82

See application file for complete search history.

(56) References Cited

U.S. PATENT DOCUMENTS

| | | | | |
|---|---|---|---|---|
| 12,380,694 | B2 * | 8/2025 | Saxena | H04L 67/60 |
| 2020/0250424 | A1 * | 8/2020 | Klein | G06T 7/13 |
| 2021/0034866 | A1 * | 2/2021 | Appel | G06V 20/20 |
| 2021/0073692 | A1 * | 3/2021 | Saha | G06Q 10/06316 |
| 2023/0386132 | A1 * | 11/2023 | Chen | G06T 17/05 |
| 2023/0386199 | A1 * | 11/2023 | Klein | G06V 20/188 |
| 2025/0218157 | A1 * | 7/2025 | Marland | G06V 10/774 |
| 2025/0272813 | A1 * | 8/2025 | Wang | G06V 10/776 |

* cited by examiner

*Primary Examiner* — Utpal D Shah
(74) *Attorney, Agent, or Firm* — Li & Cai Intellectual Property Office

(57) ABSTRACT

A tree assessment method and a tree assessment device are provided, including steps: acquiring a tree image set to be evaluated, wherein the tree image set to be evaluated includes a plurality of tree images to be evaluated; using a tree risk assessment model that is pre-constructed to perform a risk prediction and a multi-scale feature extraction on each of the plurality of tree images to be evaluated to obtain a risk assessment result and a multi-scale feature; generating an initial assessment report based on the risk assessment result and determining a similarity between the multi-scale feature and a target risk category feature that is pre-stored; and generating a tree assessment report based on the similarity and the initial assessment report.

7 Claims, 1 Drawing Sheet

TREE ASSESSMENT METHOD AND TREE ASSESSMENT DEVICE

FIELD OF THE DISCLOSURE

The present disclosure relates to the field of artificial intelligence technology, particularly to a tree assessment method and a tree assessment method device.

BACKGROUND OF THE DISCLOSURE

Existing methods for tree risk assessment mainly include quantitative risk assessment methods and qualitative risk assessment methods. Quantitative risk assessment methods estimate the probabilities and consequences of events using corresponding formulas to calculate risk levels. The accuracy of these methods depends on statistical analysis of samples. Currently, there is limited data collected systematically on the basis of risk probabilities. The estimation of factors in the formulas heavily relies on the subjective experience and estimation ability of tree experts, leading to high uncertainty in tree risk assessments. Qualitative risk assessment methods use ratings of event probabilities and consequences to determine risk levels and evaluate these levels against qualitative standards. Typically, ratings are combined in a matrix to classify risks. The limitation of qualitative risk assessment methods lies in their inherent subjectivity and ambiguity. In summary, both methods currently require tree experts to conduct manual surveys and inspections, which are time-consuming and have inconsistent accuracy.

SUMMARY OF THE DISCLOSURE

The objective of the present disclosure is to provide a tree assessment method and a tree assessment device to resolve at least one problems of the existing technology.

The present disclosure provides a tree assessment method, including: acquiring a tree image set to be evaluated, wherein the tree image set to be evaluated includes a plurality of tree images to be evaluated; using a tree risk assessment model that is pre-constructed to perform a risk prediction and a multi-scale feature extraction on each of the plurality of tree images to be evaluated to obtain a risk assessment result and a multi-scale feature, wherein the tree risk assessment model is developed by adjusting training on a feature backbone network that has been trained with a data augmentation image sample; generating an initial assessment report based on the risk assessment result and determining a similarity between the multi-scale feature and a target risk category feature that is pre-stored; and generating a tree assessment report based on the similarity and the initial assessment report.

According to the tree assessment method provided by the present disclosure, before the using the tree risk assessment model that is pre-constructed to perform a risk prediction and a multi-scale feature extraction on any of the plurality of tree images to be evaluated to obtain a risk assessment result and a multi-scale feature, the tree assessment method further includes: acquiring a plurality of tree image samples and performing a data augmentation processing on each of the plurality of tree image samples to obtain an augmentation image sample; acquiring a plurality of cross-domain external images and a tree image to be trained; pre-training a feature backbone network that is predetermined based on the plurality of cross-domain external images; iteratively training the feature backbone network that has been pre-trained based on the tree image to be trained; and training and adjusting the feature backbone network that has been iteratively trained based on the augmentation image sample to obtain the tree risk assessment model, and outputting a risk type and a feature extraction result corresponding to the augmentation image sample.

According to the tree assessment method provided by the present disclosure, after the training and adjusting the feature backbone network that has been iteratively trained based on the augmentation image sample to obtain the tree risk assessment model, and outputting a risk type and a feature extraction result corresponding to the augmentation image sample, the tree assessment method further includes: for each risk type, determining a target risk category feature corresponding to the risk type based on the feature extraction result corresponding to the augmentation image sample belonging to the risk type and storing the target risk category feature; calculating a plurality of feature similarities based on the target risk category feature and the feature extraction result corresponding to the augmentation image sample belonging to the risk type; and selecting an initial category threshold based on each of the plurality of feature similarities and storing the initial category threshold.

According to the tree assessment method provided by the present disclosure, the acquiring the tree image set to be evaluated includes: acquiring an original tree image set; performing a quality rating on each tree image in the original tree image set; feedbacking a tree image whose quality rating result is below a predetermined score threshold to a user to recollect a new tree image; and preprocessing all tree images whose quality rating results meet or exceed the predetermined score threshold to obtain the tree image set to be evaluated.

According to the tree assessment method provided by the present disclosure, the generating a tree assessment report based on the similarity and the initial assessment report includes: pushing the initial assessment report an expert for review and adjustment; comparing a similarity with an initial category threshold associated with the risk assessment result; selecting a sample to be labeled from the tree image set to be evaluated for a manual labeling based on an adjustment result and a comparison result; and generating the tree assessment report based on an adjusted initial assessment report and a labeling result of the sample to be labeled.

According to the tree assessment method provided by the present disclosure, the after selecting a sample to be labeled from the tree image set to be evaluated for a manual labeling based on an adjustment result and a comparison result, the tree assessment method further includes: optimizing a parameter of the tree risk assessment model based on the adjustment result, the sample to be labeled, and the labeling result of the sample to be labeled.

According to the tree assessment method provided by the present disclosure, the generating the initial assessment report based on the risk assessment result includes: performing a risk labeling on the tree image to be evaluated based on the risk assessment result, and determining a summarized treatment measure based on a potential risk present in the risk assessment result; and generating the initial assessment report based on the potential risk and the treatment measure present in the risk assessment result.

The present disclosure further provides a tree assessment device, including: an acquisition module configured to acquire a tree image set to be evaluated, wherein the tree image set to be evaluated includes a plurality of tree images to be evaluated; a risk prediction module configured to use a tree risk assessment model that is pre-constructed to perform a risk prediction and a multi-scale feature extraction on each of the plurality of tree images to be evaluated to obtain a risk assessment result and a multi-scale feature, wherein the tree risk assessment model is developed by adjusting training on a feature backbone network that has been trained with a data augmentation image sample; a first generation module configured to generate an initial assessment report based on the risk assessment result and determine a similarity between the multi-scale feature and a target risk category feature that is pre-stored; and a second generation module configured to generate a tree assessment report based on the similarity and the initial assessment report.

The tree assessment method and the tree assessment method device include: acquiring the tree image set to be evaluated, wherein the tree image set to be evaluated includes the plurality of tree images to be evaluated; using the tree risk assessment model that is pre-constructed to perform the risk prediction and the multi-scale feature extraction on each of the plurality of tree images to be evaluated to obtain the risk assessment result and the multi-scale feature, wherein the tree risk assessment model is developed by adjusting training on the feature backbone network that has been trained with the data augmentation image sample; generating the initial assessment report based on the risk assessment result and determining the similarity between the multi-scale feature and the target risk category feature that is pre-stored; and generating the tree assessment report based on the similarity and the initial assessment report. Through intelligent technology, the present disclosure enhances the efficiency and stability of risk assessment declarations, achieves more detailed and specific assessment and management of tree monitoring and risks, and reduces manual time costs.

BRIEF DESCRIPTION OF THE DRAWINGS

To clarify the technical solutions in the present disclosure or prior art, the following will briefly introduce the drawings used in the description of the embodiments or prior art. Obviously, the drawings described below are some embodiments of the present disclosure, and for those of ordinary skill in the art, other drawings can be obtained from these drawings without creative efforts.

DETAILED DESCRIPTION OF THE EXEMPLARY EMBODIMENTS

In order to make the objectives, technical solutions, and advantages of the present disclosure clearer, the following will describe the technical solutions in the present disclosure clearly and completely in conjunction with the accompanying drawings of the present disclosure. It is evident that the described embodiments are part of the embodiments of the present disclosure and not all of them. Based on the embodiments in the present disclosure, all other embodiments obtained by those skilled in the art without creative efforts fall within the scope of protection of the present disclosure.

The terms used in one or more embodiments of the present disclosure are merely for the purpose of describing specific embodiments and are not intended to limit one or more embodiments of the present disclosure. The singular forms “a,” “said,” and “the” as used in one or more embodiments of the present disclosure are also intended to include the plural forms unless the context clearly indicates otherwise. It should also be understood that the term “and/or” as used in one or more embodiments of the present disclosure refers to and includes any or all possible combinations of one or more of the associated listed items.

It should be understood that although terms like first, second, etc., may be used to describe various information in one or more embodiments of the present disclosure, this information should not be limited to these terms. These terms are used only to distinguish one type of information from another. For example, without departing from the scope of one or more embodiments of the present disclosure, the first information can also be referred to as the second information, and similarly, the second information can be referred to as the first information. Depending on the context, the term “if” as used herein can be interpreted to mean “when” or “upon.”

Figure 1:
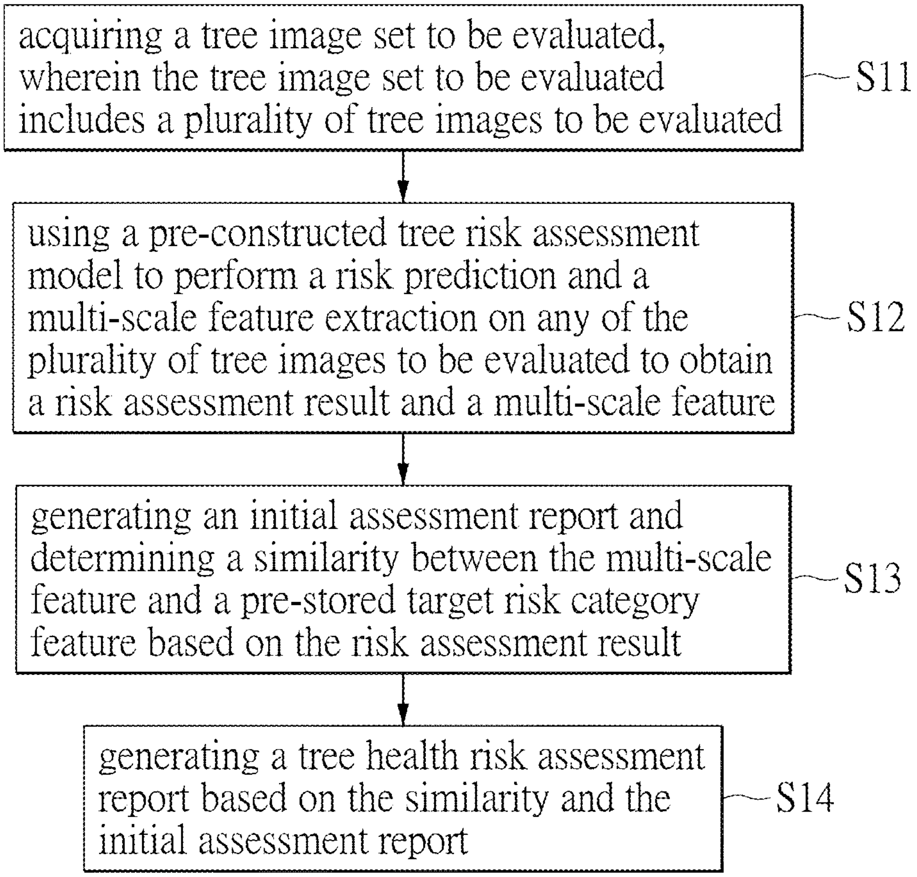
FIG. 1 is a flowchart of a tree assessment method provided by the present disclosure.

FIG. 1 is a flowchart of a tree assessment method provided by the present disclosure. As shown in FIG. 1, the tree assessment method includes: S11: acquiring a tree image set to be evaluated, wherein the tree image set to be evaluated includes a plurality of tree images to be evaluated.

It should be noted that several images of trees in the application environment and custom images are collected, and non-image data such as the location and time of collection are also recorded. An image collector follows a photo-taking process instruction set by the mobile application to standardize a collection process. For example, by setting position block lines (tree crown, trunk, and root) to standardize a position and an angle of the tree.

Specifically, the collected tree images to be evaluated are preprocessed to make them suitable for model inference and feature extraction, ensuring that the images match the input format expected by the model to guarantee the effectiveness of the inference results. The preprocessing includes, but is not limited to, processing methods for size, direction, and color, thereby obtaining the tree image set to be evaluated.

In one embodiment, to further improve the quality of the images, quality scoring can be performed on the collected tree images to be evaluated before the preprocessing. Optionally, the image quality algorithm can be classic image quality indicators in computer vision tasks, such as sharpness, contrast, brightness, and rotation. Machine learning or deep learning algorithms can also be used for analysis to obtain the quality scoring results of the images to be evaluated based on the differences between the images to be evaluated and the reference images. Then, tree images with quality scoring results lower than a predetermined score threshold are fed back to a user to collect new tree images again, so that all tree images with quality scoring results not lower than the predetermined score threshold are preprocessed to obtain the tree image set to be evaluated.

S12: using a tree risk assessment model that is pre-constructed to perform a risk prediction and a multi-scale feature extraction on each of the plurality of tree images to be evaluated to obtain a risk assessment result and a multi-scale feature.

It should be noted that the tree risk assessment model includes an image feature extraction layer (feature backbone layer) and a classification layer, where the extraction of multi-scale feature is a vector output of the image feature extraction layer (feature backbone layer), and the risk assessment result is an output of the classification layer. Specifically, any of the tree images to be evaluated can be input into the tree risk assessment model that is pre-constructured to perform the risk prediction and the multi-scale feature extraction on any of the tree images to be evaluated to obtain the risk assessment result and the multi-scale feature corresponding to any of the tree images to be evaluated. The risk assessment results can provide a risk category prediction for the image, such as unbalanced canopy, main branch, and buried tree neck.

S13: generating an initial assessment report based on the risk assessment result and determining a similarity between the multi-scale feature and a target risk category feature that is pre-stored.

It should be noted that the target risk category feature is determined in advance based on a feature of each tree image corresponding to the same risk type as the risk assessment result. The initial assessment report includes evaluation of potential risks and corresponding measures to address these potential risks.

Specifically, based on the risk assessment result, the tree images to be evaluated are labeled for risk, and then the corresponding measure to address the potential risk identified in the risk assessment result is summarized and determined. By combining the potential risk and the corresponding measure, the initial assessment report is generated, thereby achieving an automated generation of the initial tree risk assessment plan, which greatly reduces time consumed by a (tree) expert for this part of the work. Additionally, the similarity between the multi-scale feature and the target risk category feature that is pre-stored is calculated. This measures the similarity between the features of unlabeled images and the target risk category features, with a similarity calculation method such as calculating cosine similarity and Euclidean distance.

S14: generating a tree assessment report based on the similarity and the initial assessment report.

Specifically, to improve the accuracy of risk assessment, the initial assessment report can be pushed to the expert for review and adjustment. Additionally, the similarity is compared with an initial threshold value of the risk assessment results that is pre-associated. Subsequently, the tree images to be evaluated, adjusted by experts, and those with similarity below the initial threshold values, are taken as samples to be labeled and pushed to the expert for manual labeling. Furthermore, a plurality of images can be randomly selected from the tree images to be evaluated and pushed to experts for manual labeling. Further, based on the adjusted initial assessment report and the labeling results by the expert, the final tree assessment report is generated. Subsequently, the tree assessment report can be sent to a client, so that preventive measures can be taken based on the potential risks and their corresponding measures detailed in the report.

The embodiment of the present disclosure includes the following steps: acquiring the tree image set to be evaluated, wherein the tree image set to be evaluated includes the plurality of tree images to be evaluated; using the tree risk assessment model that is pre-constructed to perform the risk prediction and the multi-scale feature extraction on each of the plurality of tree images to be evaluated to obtain the risk assessment result and the multi-scale feature, wherein the tree risk assessment model is developed by adjusting training on a feature backbone network that has been trained with a data augmentation image sample; generating the initial assessment report based on the risk assessment result and determining the similarity between the multi-scale feature and the pre-stored target risk category feature; and generating the tree assessment report based on the similarity and the initial assessment report. By utilizing intelligent technology, the efficiency and stability of risk assessment are improved, so that a more detailed and specific evaluation and management of tree monitoring and risks can be achieved, and manual time costs can also be reduced.

In one embodiment of the present disclosure, before using the tree risk assessment model that is pre-constructed to perform the risk prediction and the multi-scale feature extraction on each of the plurality of tree images to be evaluated to obtain the risk assessment result and the multi-scale feature, the tree assessment method further includes: acquiring a plurality of tree image samples and performing a data augmentation processing on each of the plurality of tree image samples to obtain an augmentation image sample; acquiring a plurality of cross-domain external images and a tree image to be trained; pre-training a feature backbone network that is predetermined based on the plurality of cross-domain external images; iteratively training the feature backbone network that has been pre-trained based on the tree image to be trained; and training and adjusting the feature backbone network that has been iteratively trained based on the augmentation image sample to obtain the tree risk assessment model, and outputting a risk type and a feature extraction result corresponding to the augmentation image sample.

It should be noted that the feature backbone network is a classic convolutional neural network (CNN) category in computer vision tasks, such as the VGG family, ResNet family, or Vision Transformer (ViT) based on self-attention. To achieve applicability to low-performance machines (e.g., mobile devices), lightweight architectures using depth wise separable convolutions like MobileNet or Mobile Vision Transformer (Mobile ViT) can be used. The trained model module includes two key components, i.e., the image feature extraction layer and the classification layer.

It should be noted that, taking the convolutional neural network as an example, the image feature extraction layer typically consists of a combination of convolutional layers and pooling layers. Convolutional layers are used to detect features in the image, such as edges, textures, or shapes. Pooling layers are used to reduce the spatial dimensions of the feature maps while retaining important information. These layers together form the image feature extraction layer, which aims to extract useful representations from the original image. The classification layer is usually a fully connected layer responsible for mapping the image features to category labels. The fully connected layer converts the image feature into a vector and generates the probability distribution for each category through an activation function (e.g., SoftMax). In this way, the model can classify the image based on its features.

Specifically, the plurality of tree image samples are acquired, and each of the tree image samples is subjected to the data augmentation processing to obtain the augmentation image samples. These augmentation image samples are labeled by the tree expert for various tree risk factors, such as unbalanced canopies, co-dominant stems, weak attachments, sapwood damage, buried tree collars, heartwood decay, tree cavities/nests, reactive growth, cut/damaged roots, and previous branch failures. Additionally, a plurality of cross-domain external images and tree images to be trained are acquired, and all images are preprocessed, such as adjusting brightness and color, cropping, rotating, resizing, and scaling. Further, based on each cross-domain external image, the pre-configured feature backbone network is pre-trained, for example, using the latest image classification transfer learning method BigTransfer (also known as BiT). Further, based on each tree image to be trained, the pre-trained feature backbone network is iteratively trained, for example, using a moderate amount of external tree images for meta-training the pre-trained feature backbone network. It should be noted that the cross-domain external images are not from the tree domain and can be images from any field. The tree images to be trained specifically refer to images in the tree domain, but the labeling of these tree images can be applied to other domains, such as tree species identification and tree instance segmentation. Finally, based on each augmentation image sample, the feature backbone network after iterative training is adjusted, resulting in the tree risk assessment model, making it a task-specific feature backbone network, and outputting the risk type and the feature extraction result corresponding to any augmentation image sample.

In one embodiment of the present disclosure, after training and adjusting the feature backbone network that has been iteratively trained based on the augmentation image sample to obtain the tree risk assessment model, and outputting a risk type and a feature extraction result corresponding to the augmentation image sample, the tree assessment method further includes: for each risk type, determining a target risk category feature corresponding to the risk type based on the feature extraction result corresponding to the augmentation image sample belonging to the risk type and storing the target risk category feature; calculating a plurality of feature similarities based on the target risk category feature and the feature extraction result corresponding to the augmentation image sample belonging to the risk type; and selecting an initial category threshold based on each of the plurality of feature similarities and storing the initial category threshold.

Specifically, for each risk category, based on the feature extraction result corresponding to each augmentation image sample belonging to the risk type, the target risk category feature corresponding to the risk type is calculated. For example, the category center vector or mean vector is calculated as the target risk category feature, and the target risk category feature corresponding to the risk type is stored. Additionally, the feature similarity between the feature extraction results corresponding to each enhanced image sample belonging to the risk type and the target risk category feature are separately calculated. For example, cosine similarity or Euclidean distance is calculated as the feature similarity, and then the initial threshold is selected for the risk type from among the feature similarities for storage. For example, assuming five categories have been determined (i.e., there are five target risk category features), for category one, the similarity between each tree and the target risk category feature of category one is calculated, and a threshold t is selected such that among all trees with a similarity higher than the threshold t, the majority (x %) belongs to the category one. Then this similarity is selected as the initial threshold for storage, where x % is set according to actual conditions, for example, set to 80%.

In one embodiment of the present disclosure, generating a tree assessment report based on the similarity and the initial assessment report includes: pushing the initial assessment report to the expert for review and adjustment; comparing the similarity with an initial category threshold associated with the risk assessment result; selecting a sample to be labeled from the tree image set to be evaluated for a manual labeling based on an adjustment result and a comparison result; and generating the tree assessment report based on an adjusted initial assessment report and a labeling result of the sample to be labeled.

Specifically, to further improve the accuracy of tree risk assessment, in the present embodiment, the initial assessment report is pushed to the expert for manual review and adjustment. Additionally, the similarity is compared with the predefined initial threshold of the risk assessment result. Thus, based on the adjustment result and comparison result, samples to be labeled for manual labeling are selected from the tree images to be evaluated, for example, tree images with differences between the expert's adjustment results and the initial assessment report results, and tree images with a similarity lower than the initial threshold of the category are taken as samples to be labeled. Furthermore, the plurality of tree images can be randomly selected from the tree images to be evaluated as samples to be labeled. Then, each sample to be labeled is pushed to the expert for manual labeling. Thus, based on the adjusted initial assessment report and the labeling results of the samples to be labeled, the final tree assessment report is generated.

Moreover, the tree risk assessment model is periodically optimized for training based on the adjustment result, the sample to be labeled, and the labeling result corresponding to the sample to be labeled, thereby continuously optimizing a weight of the tree risk assessment model and improving the accuracy of the model in tree risk assessment.

In one embodiment of the present disclosure, acquiring the tree image set to be evaluated includes: acquiring an original tree image set; performing a quality rating on each tree image in the original tree image set; feedbacking a tree image whose quality rating result is below a predetermined score threshold to the user to recollect a new tree image; and preprocessing all tree images whose quality rating results meet or exceed the predetermined score threshold to obtain the tree image set to be evaluated.

Specifically, the original tree image set is captured by a camera. To improve image quality and ensure the accuracy of tree evaluation, in the present embodiment, any tree image in the original tree image set needs to be quality scored to obtain quality scoring results. Then, the quality scoring results are compared with the predetermined score threshold, which is set according to an actual situation and is not specifically limited here. Tree images with quality scoring results below the predetermined score threshold are fed back to the user for recapturing new tree images. Further, all tree images with quality scoring results not lower than the predetermined score threshold are preprocessed to obtain the tree image set to be evaluated, ensuring that the images match the expected input format of the model and guaranteeing the validity of the risk assessment results of the model.

Next, a tree assessment device provided by the present disclosure will be described. The tree assessment device described below can correspond to the tree assessment method described above.

Figure 2:
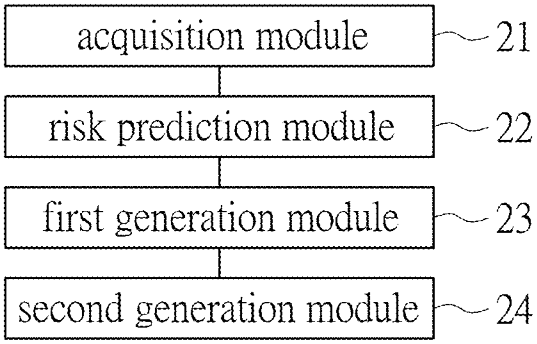
FIG. 2 is a schematic structural diagram of a tree assessment device provided by the present disclosure.

FIG. 2 is a schematic structural diagram of the tree assessment device provided by the present disclosure. As shown in FIG. 2, the tree assessment device according to an embodiment of the present disclosure includes: an acquisition module 21 configured to acquire a tree image set to be evaluated, wherein the tree image set to be evaluated includes a plurality of tree images to be evaluated; a risk prediction module 22 configured to use a tree risk assessment model that is pre-constructed to perform a risk prediction and a multi-scale feature extraction on each of the plurality of tree images to be evaluated to obtain a risk assessment result and a multi-scale feature, wherein the tree risk assessment model is developed by adjusting training on a feature backbone network that has been trained with a data augmentation image sample; a first generation module 23 configured to generate an initial assessment report based on the risk assessment result and determine a similarity between the multi-scale feature and a target risk category feature that is pre-stored; and a second generation module 24 configured to generate a tree assessment report based on the similarity and the initial assessment report.

The tree assessment device further includes: acquiring a plurality of tree image samples and performing a data augmentation processing on each of the plurality of tree image samples to obtain an augmentation image sample; acquiring a plurality of cross-domain external images and a tree image to be trained; pre-training a feature backbone network that is predetermined based on the plurality of cross-domain external images; iteratively training the feature backbone network that has been pre-trained based on the tree image to be trained; and training and adjusting the feature backbone network that has been iteratively trained based on the augmentation image sample to obtain the tree risk assessment model, and outputting a risk type and a feature extraction result corresponding to the augmentation image sample.

The tree assessment device further includes: for each risk type, determining a target risk category feature corresponding to the risk type based on the feature extraction result corresponding to the augmentation image sample belonging to the risk type and storing the target category feature; calculating a plurality of feature similarities based on the target risk category feature and the feature extraction result corresponding to the augmentation image sample belonging to the risk type; and selecting an initial category threshold based on each of the plurality of feature similarities and storing the initial category threshold.

The tree assessment device further includes: acquiring an original tree image set; performing a quality rating on each tree image in the original tree image set; feedbacking a tree image whose quality rating result is below a predetermined score threshold to a user to recollect a new tree image; and preprocessing all tree images whose quality rating results meet or exceed the predetermined score threshold to obtain the tree image set to be evaluated.

The tree assessment device further includes: pushing the initial assessment report to an expert for review and adjustment; comparing the similarity with an initial category threshold associated with the risk assessment result; selecting a sample to be labeled from the tree image set to be evaluated for a manual labeling based on an adjustment result and a comparison result; and generating the tree assessment report based on an adjusted initial assessment report and a labeling result of the sample to be labeled.

The tree assessment device further includes: performing a risk labeling on a tree image to be evaluated based on the risk assessment result, and determining a summarized treatment measure based on a potential risk present in the risk assessment result; and generating the initial assessment report based on the potential risk and the treatment measure present in the risk assessment result.

It should be noted that the device provided in the embodiment of the present disclosure can achieve all the method steps realized in the method embodiments described above and can achieve the same technical effects. Therefore, the same parts and beneficial effects as in the method embodiments will not be reiterated herein.

The above-described device embodiments are merely illustrative. The units described as separate components may be or may not be physically separated, and the components shown as units may be or may not be physical units, that is, they can be located in one place or can be distributed across a plurality of network units. Some or all of the modules can be selected to achieve the purpose of the embodiment according to actual needs. Those skilled in the art can understand and implement it without creative work.

From the above description of the embodiments, it can be clearly understood by those skilled in the art that each embodiment can be implemented by means of software plus a necessary general hardware platform, and of course, it can also be implemented by hardware. Based on such understanding, the essence of the technical solutions of the present disclosure, or the part that makes contributions to the prior art, can be embodied in the form of a software product, which is stored in a computer-readable storage medium such as ROM/RAM, magnetic disk, or optical disk, and includes several instructions for enabling a computer device (which can be a personal computer, server, or network device, etc.) to execute the methods described in each embodiment or some parts of the embodiments.

Finally, it should be noted that the above embodiments are only used to illustrate the technical solutions of the present disclosure, and not to limit them; although the present disclosure has been described in detail with reference to the foregoing embodiments, those of ordinary skill in the art should understand that they can still modify the technical solutions described in the foregoing embodiments, or make equivalent replacements for some technical features; and these modifications or replacements do not make the essence of the corresponding technical solutions deviate from the scope of the technical solutions of the present disclosure.

What is claimed is:

1. A tree assessment method, comprising:

acquiring a tree image set to be evaluated, wherein the tree image set to be evaluated includes a plurality of tree images to be evaluated;

using a tree risk assessment model that is pre-constructed to perform a risk prediction and a multi-scale feature extraction on each of the plurality of tree images to be evaluated to obtain a risk assessment result and a multi-scale feature, wherein the tree risk assessment model is developed by adjusting training on a feature backbone network that has been trained with a data augmentation image sample;

generating an initial assessment report based on the risk assessment result and determining a similarity between the multi-scale feature and a target risk category feature that is pre-stored; and generating a tree assessment report based on the similarity and the initial assessment report;

wherein, before the using a tree risk assessment model that is pre-constructed to perform a risk prediction and a multi-scale feature extraction on any of the plurality of tree images to be evaluated to obtain a risk assessment result and a multi-scale feature, further comprising:

acquiring a plurality of tree image samples and performing a data augmentation processing on each of the plurality of tree image samples to obtain an augmentation image sample;

acquiring a plurality of cross-domain external images and a tree image to be trained;

pre-training a feature backbone network that is predetermined based on the plurality of cross-domain external images;

iteratively training the feature backbone network that has been pre-trained based on the tree image to be trained; and training and adjusting the feature backbone network that has been iteratively trained based on the augmentation image sample to obtain the tree risk assessment model, and outputting a risk type and a feature extraction result corresponding to the augmentation image sample.

2. The tree assessment method according to claim 1, wherein, after the training and adjusting the feature backbone network that has been iteratively trained based on the augmentation image sample to obtain the tree risk assessment model, and outputting a risk type and a feature extraction result corresponding to the augmentation image sample, further comprising:

for each risk type, determining a target risk category feature corresponding to the risk type based on the feature extraction result corresponding to the augmentation image sample belonging to the risk type and storing the target risk category feature;

calculating a plurality of feature similarities based on the target risk category feature and the feature extraction result corresponding to the augmentation image sample belonging to the risk type; and selecting an initial category threshold based on each of the plurality of feature similarities and storing the initial category threshold.

3. The tree assessment method according to claim 1, wherein the acquiring a tree image set to be evaluated includes:

acquiring an original tree image set;

performing a quality rating on each tree image in the original tree image set;

feedbacking a tree image whose quality rating result is below a predetermined score threshold to a user to recollect a new tree image; and preprocessing all tree images whose quality rating results meet or exceed the predetermined score threshold to obtain the tree image set to be evaluated.

4. The tree assessment method according to claim 1, wherein the generating a tree assessment report based on the similarity and the initial assessment report includes:

pushing the initial assessment report to an expert for review and adjustment;

comparing the similarity with an initial category threshold associated with the risk assessment result;

selecting a sample to be labeled from the tree image set to be evaluated for a manual labeling based on an adjustment result and a comparison result; and generating the tree assessment report based on an adjusted initial assessment report and a labeling result of the sample to be labeled.

5. The tree assessment method according to claim 4, wherein, after the selecting a sample to be labeled from the tree image set to be evaluated for a manual labeling based on an adjustment result and a comparison result, further including:

optimizing a parameter of the tree risk assessment model based on the adjustment result, the sample to be labeled, and the labeling result of the sample to be labeled.

6. The tree assessment method according to claim 1, wherein the generating an initial assessment report based on the risk assessment result includes:

performing a risk labeling on the tree image to be evaluated based on the risk assessment result, and determining a summarized treatment measure based on a potential risk present in the risk assessment result; and generating the initial assessment report based on the potential risk and the treatment measure present in the risk assessment result.

7. A tree assessment device for executing the tree assessment method of claim 1, comprising:

an acquisition module configured to acquire a tree image set to be evaluated;

a risk prediction module configured to perform the risk prediction and the multi-scale feature extraction on each of the plurality of tree images to be evaluated using the tree risk assessment model;

a first generation module configured to generate the initial assessment report and determine the similarity; and a second generation module configured to generate the tree assessment report.

* * * * *